United States Patent [19]

Mattila et al.

[11] 4,101,141

[45] Jul. 18, 1978

[54] DRIVE CHUCK

[75] Inventors: Eugene W. Mattila; Joseph M. Maher, both of White Pine, Mich.

[73] Assignee: Copper Range Company, White Pine, Mich.

[21] Appl. No.: 778,093

[22] Filed: Mar. 16, 1977

[51] Int. Cl.² .......... B23B 31/06

[52] U.S. Cl. .......... 279/19

[58] Field of Search .......... 81/119, 121 R, 121 A; 279/19; 173/50

[56] References Cited

U.S. PATENT DOCUMENTS

| | | | |
|---|---|---|---|
| 622,005 | 3/1899 | Herrick | 81/119 |
| 3,228,269 | 1/1966 | Heyer | 81/3 R |
| 3,563,559 | 2/1971 | Taylor | 274/19 |

FOREIGN PATENT DOCUMENTS

| | | | |
|---|---|---|---|
| 713,196 | 8/1954 | United Kingdom | 279/19 |

*Primary Examiner*—Harold D. Whitehead
*Attorney, Agent, or Firm*—Curtis, Morris & Safford

[57] ABSTRACT

A drive chuck for use with a plurality of driven elements, such as for example a rock drill and a roof bolt, comprises a chuck body having an upper surface and a longitudinally extending slot formed thereon opening along the side of the chuck. The chuck body includes a base portion located generally parallel to the upper surface of the chuck body, above the lower end of the body, and both the upper surface and base portion of the chuck have recesses formed therein, in general longitudinal alignment with each other and with the slot, adapted to engage the end of a tool to be driven.

10 Claims, 8 Drawing Figures

FIG. 5
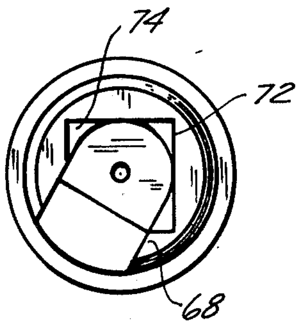
FIG. 4
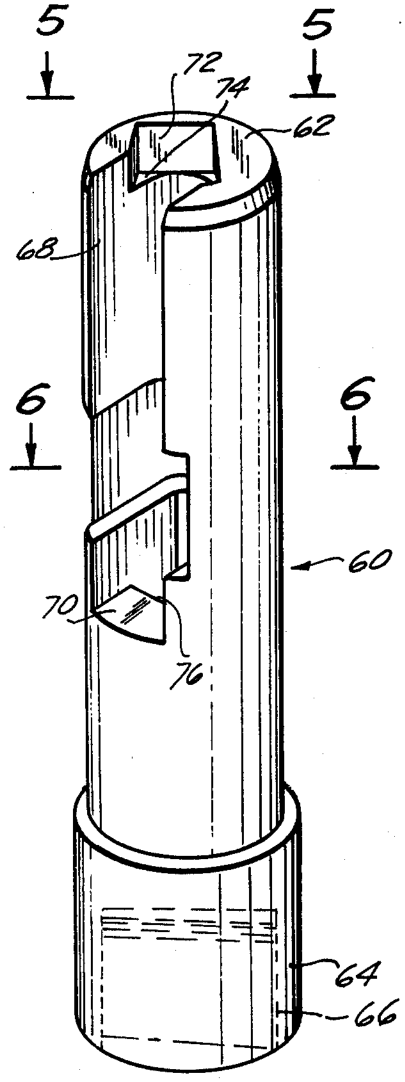
FIG. 7
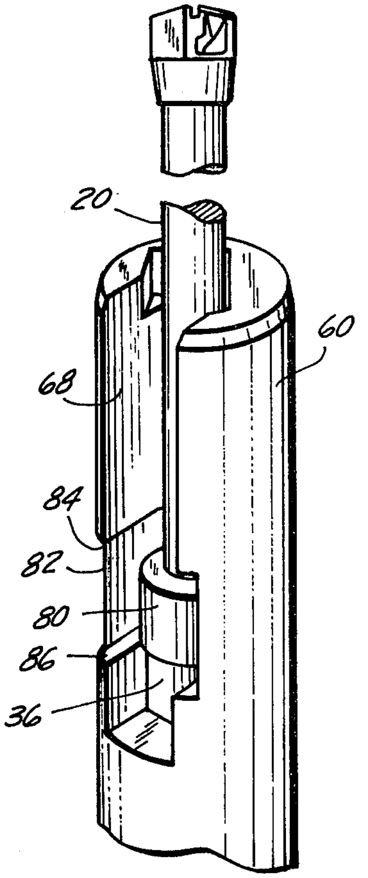
FIG. 6
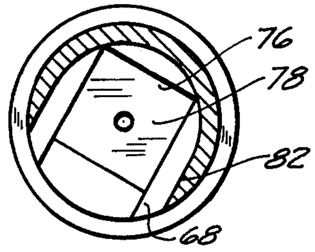
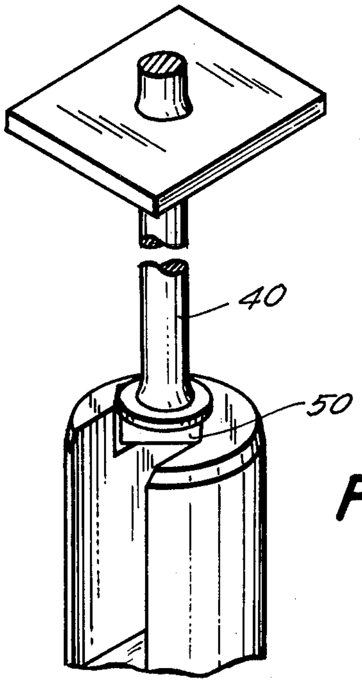
FIG. 8

DRIVE CHUCK

The present invention relates to drive chucks and, more particularly, to a drive chuck adapted to drive a plurality of separate driven elements or tools.

The drive chuck of the invention is particularly adapted for use in drilling holes and mounting roof bolts in mine ceilings or walls. Heretofore in mining operations a hole was drilled in the ceiling or roof of a mine opening with a drill rod having a tool bit mounted at one end. The drill rod is mounted in a chuck which is connected to a power drill. After the hole is drilled in the rock wall or ceiling, the drill rod is extracted and removed from the drive chuck. Then, a roof bolt or anchor is manually inserted in the drilled hole and a separate roof bolt insertion wrench is mounted on the drive chuck of the drill. The roof bolt is tightened against a plate by the insertion wrench to lock the plate in place; the plate serves to hold the rock wall or ceiling up. With such previously proposed methods, numerous manual operations are required to remove the drill rod from the chuck and insert the insertion wrench therein, with the additional requirement that the insertion wrench had then to be engaged with the roof bolt in order to tighten the bolt in place.

It is an object of the present invention to simplify the formation of drill holes in mine opening walls or ceilings and eliminate the need for an insertion wrench to turn a roof bolt into the hole.

Another object of the present invention is to provide a drive chuck which is useful to drive both the drill rod and a roof bolt.

Another object of the present invention is to provide a drive chuck which can be used with a multiplicity of tools, but which is relatively simple in construction.

Another object of the present invention is to provide a drive chuck which is adapted to drive a plurality of tools, but which is relatively inexpensive to manufacture and which is durable in use.

In accordance with an aspect of the present invention a drive chuck is provided for use with a plurality of driven elements such as for example a drill rod and a roof bolt. The chuck comprises a cylindrical chuck body which has upper and lower ends and a cylindrical side wall extending therebetween. The chuck body has an elongated generally U-shaped longitudinally extending slot formed therein, extending from a first end at the upper end of the chuck body to a second end at an intermediate position along the chuck body. The slot opens through the cylindrical side wall of the chuck body and the second end of the slot defines a base wall in the chuck body between the upper and lower ends thereof. The upper end of the chuck body and the base wall of the slot have recesses formed therein located in generally axial alignment with the longitudinal axis of the body. These recesses are adapted to engage the ends of tools to be driven through the chuck. The slot is dimensioned to receive a tool in axial alignment with the chuck body so that the lower end of the tool can be inserted in the recess in the base wall.

The above, and other objects, features and advantages of this invention will be apparent in the following detailed description of an illustrative embodiment thereof, which is to be read in connection with the accompanying drawings, wherein:

FIG. 4 is a perspective view of a drive chuck constructed in accordance with the present invention;

FIG. 5 is a top plan view taken along line 5-5 of FIG. 4;

FIG. 6 is a sectional view taken along line 6-6 of FIG. 4;

FIG. 7 is a partial perspective view showing a drill insertion wrench mounted in the drive chuck of the present invention; and FIG. 8 is a partial perspective view showing a roof bolt mounted in the drive chuck of the present invention.

Figure 1:
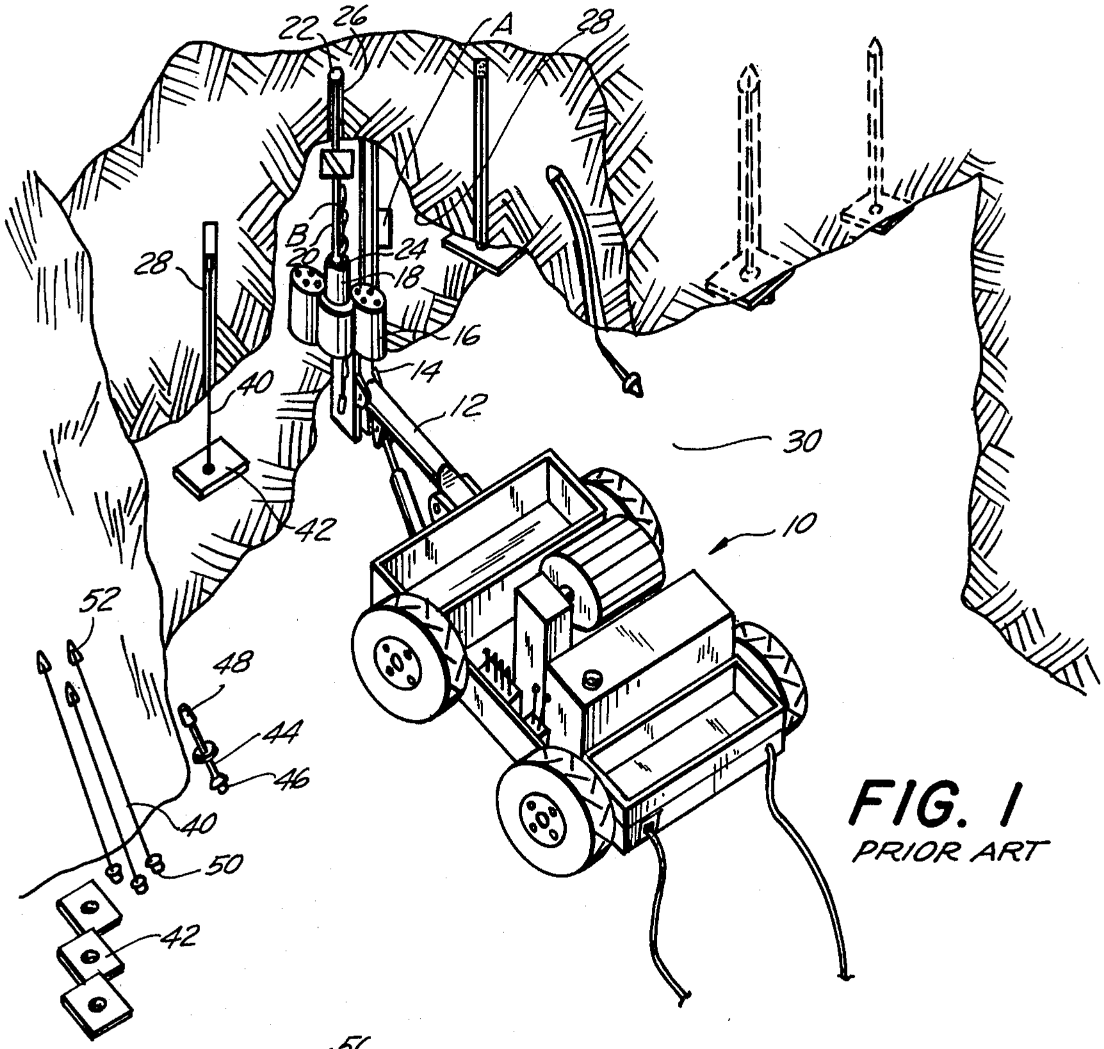
FIG. 1 PRIOR ART
FIG. 1 is a perspective diagramatic view of a conventional method for drilling holes in a mine opening roof, and inserting roof bolts therein.

Referring now to the drawings in detail, and initially to FIG. 1 thereof, the conventional method for inserting roof bolts in the roof of a mine shaft is illustrated. In such conventional operations a powered mobile cart 10 is provided which includes a horizontal boom 12 from which a vertical boom or sash 14 extends. Sash 14 has a drill or drive unit 16 mounted thereon in the conventional manner in which a drive chuck 18 of conventional construction is secured. In the typical operation a drill rod 20, having a drill bit 22 mounted or formed on its upper end, is inserted at its lower end 24 in chuck 18 so that the drill rod can be rotated by drill 16 to form a hole 26 in the roof 28 of the mine opening 30.

Figure 2:
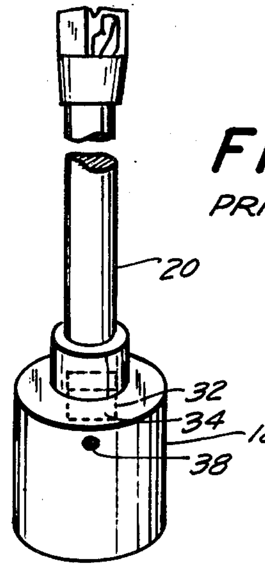
FIG. 2 PRIOR ART
FIG. 2 is a perspective view of a conventional chuck and drill tool assembly.

As illustrated in FIG. 2 a conventional chuck 18 consists simply of a cylindrical body having a square recess 32 formed therein which is adapted to receive the complementary square boss 34 on the lower end of drill rod 20.

A reversible hydraulic motor A on boom element 14 drives a chain B, operatively connected to drill 16 to advance and retract the drill motor.

After hole 26 is completely formed, the drill motor is retracted by actuation of hydraulic motor A and the drill rod is then removed from chuck 18 by pulling the drill rod from chuck recess 32. Thereafter a roof bolt 40 having a roof plate 42 mounted thereon is manually inserted in the hole 28. An insertion wrench 44 is then mounted with its lower end 46 in chuck 18 on drill 16, and its upper end 48 is engaged with the lower end 50 of the roof bolt previously placed in hole 26. The bolt is then rotated to tighten the anchor 52 at its upper end, thereby to secure the bolt in place so that plate 42 can serve to shore or hold up the mine roof.

Figure 3:
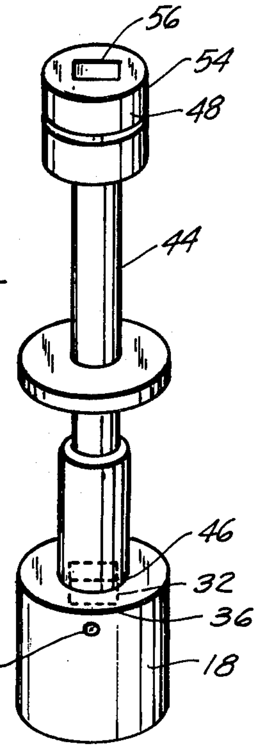
FIG. 3 PRIOR ART
FIG. 3 is a perspective view of a conventional chuck and bolt insertion wrench assembly.

As illustrated in FIG. 3 the conventional insertion wrench 44 has a socket 54 formed at its upper end 48. This socket includes a generally square recess 56 formed therein which is complementary to the boss end 50 of roof bolt 40.

Typically boss end 50 of the roof bolt has a different shape or dimension than the lower end of the drill rod 20, thus the chuck cannot be directly engaged with the boss end 50 of the roof bolt. Accordingly, end 46 of insertion wrench 44 has a boss formed thereon which is similar to boss 32 of drill rod 20, and this is seated in recess 32 of chuck 18. Again the insertion wrench is locked in place in the drill chuck by set screw 38. After the roof bolt is locked in place, the insertion wrench is removed from chuck 18 and the drill rod 20 is reinserted therein to permit drilling of the next hole.

In accordance with the present invention a drive chuck is provided which is adapted to drive both drill rod 20 and roof bolt 50, without the use of insertion wrench 44. As illustrated in FIG. 4 the drive chuck 60 of the present invention comprises a generally cylindrical body having an upper end 62 and a lower end 64. The lower end of the chuck has a recess 66 formed therein which is internally threaded so that the chuck can be threaded onto the end of the drill 16 in the conventional manner. As elongated slot 68, having a generally U-shaped cross section (see FIGS. 5 and 6) is formed in chuck body 60 extending from the upper end 62 thereof to an intermediate position along the length of the chuck body. The lower end of slot 68 forms a base wall 70 which is generally parallel to the top end or surface 62 of the chuck body.

Upper wall 62 of chuck 60 has a recess 72 formed therein. This recess is polygonal in shape and is generally complementary to the configuration of the boss 56 formed on the lower end of roof bolt 40, as illustrated in FIG. 8. The recess has dimensions which are somewhat greater than the width dimension of slot 68 (i.e. the dimension between the legs of the U-shaped slot) so that a base shoulder 74 is formed along the periphery of recess 72.

As seen in FIG. 5 the recess 72 has four sides, although two of the sides only form part of the periphery, since they are interrupted by slot 68. By this arrangement the roof bolt is held in a fixed position with respect to the longitudinal axis of the chuck body and is locked against rotation with respect to the chuck body so that when the drill is operated the roof bolt will be rotated. In this connection it is noted that the center axis of recess 72 is aligned with the central longitudinal axis of the clutch body, so that there is no eccentric rotation of the roof bolt when the drive clutch is rotated.

Base wall 70 at the lower end of slot 68 also has a drive recess formed therein. This recess, i.e. the recess 76, is also of a polygonal configuration. In the illustrative embodiment recess 76 has a square configuration and is complementary to the square boss 34 on the lower end of drill rod 20. Thus recess 76 is adapted to receive the lower end of the drill rod and hold the drill rod in relatively fixed position against rotation with respect to the chuck body 60, as illustrated in FIG. 7. Recess 76 has a base 78 formed therein on which the lower end of boss 34 rests, so that the drill rod is held against downward movement in the chuck body. During the drilling operation an upward force is applied to the lower end of the drill body, so that the drill is driven against the rock wall, and therefore the drill is held against any longitudinal movement during operation of the drive chuck.

In the illustrative embodiment of the invention drill rod 20 is provided with an integral annular collar 80, as is conventional in most rock hole drills. To accommodate collar 80 an enlarged slot portion 82 is provided in slot 68. The enlarged slot portion 82 has a generally U-shaped configuration, as seen in the sectional view of FIG. 6, and it is congruent with slot 68. In this manner upper and lower shoulders 84, 86 are formed in slot 68 at opposite ends of enlarged slot portion 82. These shoulders serve to limit longitudinal movement of the drill rod in the drive chuck during movement of the drive chuck away from the drill hole.

In a rock hole drilling operation using the drive chuck of the present invention the drive chuck is secured to drill 16 by threadably engaging the lower end 64 of the drive chuck on the drill. The drill rod is then moved laterally with respect to the drive chuck 60 and manually inserted into slot 68, with collar 80 on the drill rod aligned with enlarged slot portion 82, and with the upper end of the collar adjacent the upper shoulder 84 of the enlarged slot portion. After the drill rod is inserted to its maximum extent, it is allowed to drop so that the lower end of boss 34 engages base 78 of recess 76. Preferably the depth of the recess 76 is selected such that the lower end of collar 80 is adjacent shoulder 86 when the drill is properly in place (see FIG. 7). In this regard it is noted that the curved portion of U-shaped slot 68 is located such that its central axis is located in alignment with the longitudinal axis of the drive chuck 60, and its radius of curvature is selected to be generally complementary to the radius of curvature of drill rod 20, so that the drill rod is held snugly in place in the curved portion of the slot, in longitudinal alignment with the longitudinal axis of chuck 60.

The enlarged slot portion 82 serves as a locking chamber during the operation with the drill rod in place, since the radius of curvature of its curved portion is complementary to the radius of curvature of collar 80. Thus the drill rod is held in a stable position along a substantial portion of its length during the drilling operation, providing the drill with far more stability then the conventional drilling arrangement shown in FIG. 3. After the rock hole is drilled, drill rod and chuck 60 are moved vertically away from the rock hole by the operation of chain B activated by hydraulic motor A. Should the drill rod become stuck in the rock hole for some reason, the upper surface of collar 80 on the drill rod will engage the upper shoulder 84 of the enlarged slot portion 82, and aid in pulling the drill rod from the rock hole.

After the drill rod is removed from the rock hole the drill is readily removed from the drive chuck, in the same manner in which it was inserted. Then, the drive chuck is free for engagement with the lower end 50 of roof bolt 40. As in the previously described process, the roof bolt is manually inserted in the previously drilled rock hole, and after it is positioned, the drive chuck is simply moved into engagement with the boss 50 on the lower end of the roof bolt. Thereafter the drill is operated to rotate the roof bolt and operate anchor 52. After the roof bolt is set in place, the chuck is simply moved away from the end of the bolt and it is free for engagement with drill rod 20 for dilling of the next hole.

Accordingly, it is seen that by the present invention the need for an insertion wrench is completely eliminated. The elimination of the wrench improves the safety operations within the mine shaft, since an additional manual movement of a tool is eliminated and, in addition, productivity within the mine is increased. Moreover when the drive chuck is used to operate the drill rod, stabilization of the drill is greatly improved as compared to the previous chuck arrangements. Unstable and stuck drill steels, stuck in rock holes, represent safety hazards and productivity bottlenecks. This is avoided to a substantial extent by use of the drive chuck of the present invention. In addition, a single drive chuck, using no moving parts, is adapted to perform three functions, namely to drive and positively retain the drill rod, and to form a socket for thrusting and rotating the roof bolt. Therefore it represents a substantial improvement in economy, as compared to the multiplicity of tools required in previously proposed methods.

The drive chuck can be made in a variety of sizes, with the recess 66 formed in a variety of dimensions, so that it can be secured to most rotary drills, and with recesses 72, 76 compatible with most if not all roof bolt drill rods and roof bolts manufactured in this country. Of course, since the drive chuck is a one piece metal unit, it is substantially maintenance free, and can be relatively rapidly replaced if damaged.

Although an illustrative embodiment of the invention has been described herein with reference to the accompanying drawings, it is to be understood that the invention is not limited to that precise embodiment, and that various changes and modifications may be effected therein by one skilled in the art without departing from the scope or spirit of this invention.

What is claimed is:

1. A drive chuck for use with a plurality of driven elements comprising a chuck body having an upper surface and a longitudinally extending elongated slot formed therein, said slot opening along the side of the chuck and including a closed base portion located generally parallel to said upper surface, said upper surface having a first recess formed therein in general alignment with said slot, said recess including portions extending beyond the slot to define a base shoulder along the periphery of the recess below said upper surface, and said base portion having a second recess formed therein in general alignment with said slot and having a base shoulder extending across the slot below said base portion whereby said recesses define pockets adapted to receive the end of a tool to be driven through the chuck with the end of the tool received in the pocket supported on the respective base shoulder.

2. A drive chuck as defined in claim 1 wherein said recesses are polygonal in plan and complementary to the end of the tool to be driven.

3. A drive chuck as defined in claim 1 wherein said slot is generally U-shaped in cross section and opens along a side of said chuck body.

4. A drive chuck as defined in claim 3 wherein said slot includes an enlarged section intermediate to said panel and base surface to accommodate an enlarged portion of a tool having a lower end received in the recess in said base surface.

5. A drive chuck as defined in claim 1 including a lower end having a threaded recess formed therein.

6. A drive chuck for use with a plurality of driven elements comprising a cylindrical chuck body having upper and lower ends and a cylindrical side wall; said chuck body having an elongated generally U-shaped longitudinally extending slot formed therein extending from a first end at said upper end to a second end at an intermediate position along the chuck body; said slot opening through said cylindrical side wall of the chuck and said second end of the slot defining a base wall in the chuck body between said upper and lower ends; said upper end of the chuck body and said base wall having recesses formed therein located in axial alignment with the longitudinal axis of said body, said recess in said upper end of the chuck body having a maximum cross-sectional dimension which is greater than the maximum cross-sectional dimension of the slot between the legs thereof to define a pocket about the slot and said recess in said base wall having a base shoulder extending across said slot below the base wall whereby said recesses each define a pocket adapted to receive and engage the ends of tools to be driven through the chuck; said slot being dimensioned to receive a tool in axial alignment with the chuck body whereby the lower end of the tool can be inserted in the recess in said base wall.

7. A drive chuck as defined in claim 6 wherein said recesses are polygonal in plan and complementary to the tools to be driven.

8. A drive chuck as defined in claim 7 wherein said slot includes an enlarged section intermediate to said panel and base surface to accommodate an enlarged portion of a tool having a lower end received in the recess in said base surface.

9. A drive chuck as defined in claim 8 including a lower end having a threaded recess formed therein.

10. A drive chuck as defined in claim 7 wherein said enlarged section is U-shaped in cross section and is congruent with said slot; said enlarged section forming oppositely facing shoulders in said slot to engage said enlarged portion of the tool to restrict longitudinal movement thereof.

* * * * *